(12) United States Patent
Murari et al.

(10) Patent No.: US 8,362,674 B2
(45) Date of Patent: Jan. 29, 2013

(54) SILICON ELECTROSTATIC MICROMOTOR WITH INDENTATIONS, IN PARTICULAR FOR PROBE-STORAGE SYSTEMS

(75) Inventors: Bruno Murari, Monza (IT); Ubaldo Mastromatteo, Bareggio (IT); Giulio Ricotti, Broni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 714 days.

(21) Appl. No.: 12/533,835

(22) Filed: Jul. 31, 2009

(65) Prior Publication Data
US 2010/0026137 A1    Feb. 4, 2010

(30) Foreign Application Priority Data
Jul. 31, 2008 (IT) ................ TO2008A0604

(51) Int. Cl.
*H02N 1/00* (2006.01)
(52) U.S. Cl. ........................... 310/309; 324/686
(58) Field of Classification Search ............ 310/309, 310/12–14, 12.01–12.33; 324/686, 658, 324/660
See application file for complete search history.

(56) References Cited

U.S. PATENT DOCUMENTS
6,657,359 B1 * 12/2003 Hoen et al. ............... 310/309
7,265,476 B1 * 9/2007 Abushagur et al. ........ 310/309
2001/0028203 A1 * 10/2001 Kasahara et al. .......... 310/309
2006/0006759 A1   1/2006 Matsuki

OTHER PUBLICATIONS

Jacobsen et al., "The Wobble Motor: Design, Fabrication and Testing of an Eccentric-Motion Electrostatic Microactuator," IEEE Proceedings of the International Conference on Robotics and Automation, vol. 3, Scottsdale, Arizona, May 14-19, 1989, pp. 1536-1546.

* cited by examiner

*Primary Examiner* — Quyen Leung
*Assistant Examiner* — Leda Pham
(74) *Attorney, Agent, or Firm* — Seed IP Law Group PLLC

(57) ABSTRACT

In an electrostatic micromotor, a mobile substrate faces a fixed substrate, and electrostatic-interaction elements are provided to allow a relative movement of the mobile substrate with respect to the fixed substrate in a direction of movement. The electrostatic-interaction elements include electrodes arranged on a facing surface of the fixed substrate (2) facing the mobile substrate. The mobile substrate has indentations, which extend within the mobile substrate starting from a respective facing surface that faces the fixed substrate and define between them projections staggered with respect to the electrodes in the direction of movement. Side walls of the indentations have a first distance of separation at the respective facing surface, and a second distance of separation, greater than the first distance of separation, at an internal region of the indentations.

21 Claims, 2 Drawing Sheets

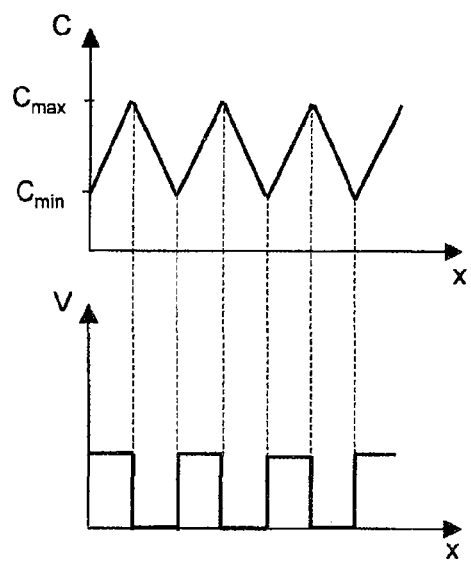
Fig.1a
Fig.1b
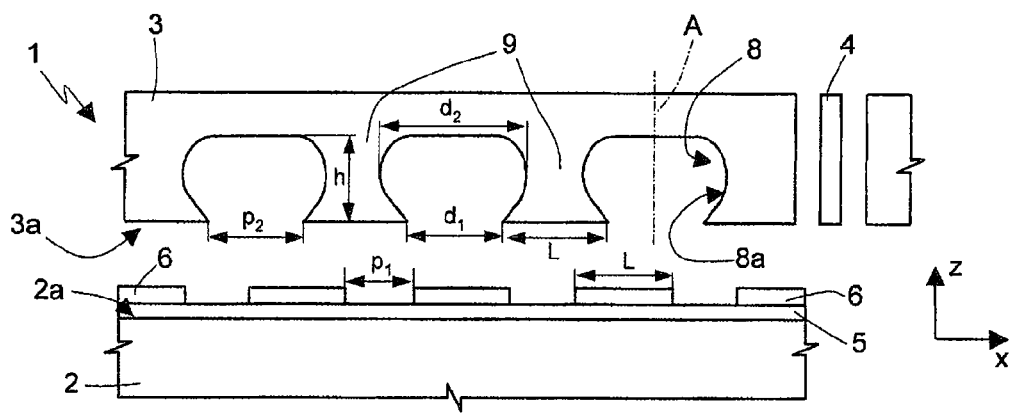
Fig.2
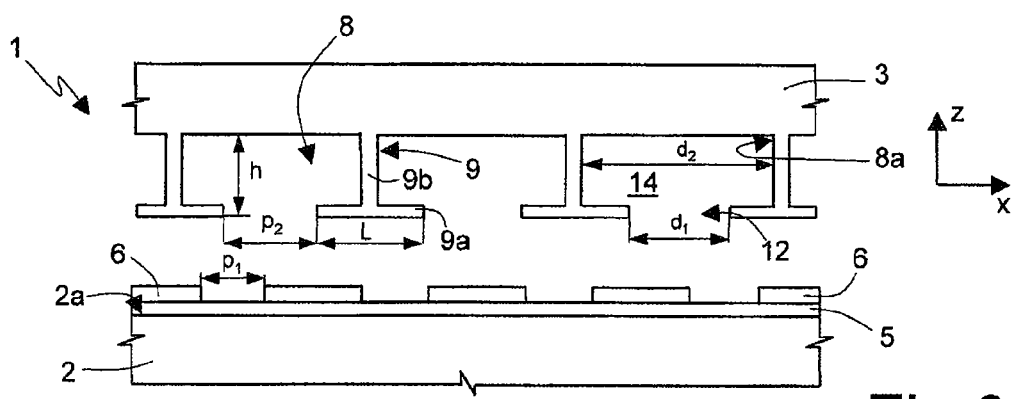
Fig.3

SILICON ELECTROSTATIC MICROMOTOR WITH INDENTATIONS, IN PARTICULAR FOR PROBE-STORAGE SYSTEMS

BACKGROUND

1. Technical Field

The present disclosure relates to a silicon electrostatic micromotor with indentations, in particular for atomic-level storage systems (generally known as "probe-storage systems"), to which the ensuing treatment will make reference, without this implying any loss of generality.

2. Description of the Related Art

As is known, storage systems that exploit a technology based on magnetism, such as for example hard disks, suffer from important limitations as regards the increase in the data-storage capacity and the read/write speed, and the decrease in their dimensions. In particular, a physical limit exists, the so-called "superparamagnetic limit", which hinders the reduction in the dimensions of the magnetic-storage domains below a critical threshold, if the risk of losing the stored information is to be avoided.

In the last few years, alternative storage systems have consequently been proposed, amongst which the so-called probe-storage systems have assumed particular importance. These systems enable high data-storage capacities to be achieved in reduced dimensions and with low production costs.

In brief, probe-storage systems envisage the use of an array of transducers (or probes) fixed to a common substrate and each provided with a respective read/write head. The array is positioned in use above a storage medium (e.g., made of polymeric material, ferro-electric material, phase-change material, etc.), and is mobile with respect thereto. Each probe is thus able to interact locally with a portion of the storage medium, for writing, reading or erasing individual information bits. In particular, the relative movement between the storage medium and the array of transducers is generated by a micromotor coupled to the storage medium.

In this connection, electrostatic micromotors are known for generating a linear movement, that are made using technologies of micromachining of semiconductor materials (the so-called MEMS technologies). These electrostatic micromotors base their operation on a capacitive interaction between a fixed substrate (known as "stator") and a mobile substrate that is able to move with respect to the fixed substrate (known as "rotor", without this term, however, implying the presence of a rotary movement).

The rotor substrate is generally suspended over the stator substrate via elastic elements. Electrostatic-interaction elements carried by the rotor substrate and stator substrate, for example, rotor and stator electrodes arranged on respective facing surfaces, determine, when appropriately biased, a translation relative movement of the rotor substrate with respect to the stator substrate in a sliding direction.

In particular, the stator electrodes and rotor electrodes form capacitors with plane parallel faces that are misaligned. When a suitable biasing voltage is applied between these misaligned faces, an electrostatic interaction force is generated, which tends to bring them back into a position of alignment, determining the resulting movement of the rotor substrate with respect to the stator substrate. In greater detail, the capacitance of the capacitors formed by the stator electrodes and rotor electrodes varies according to their relative position and in particular is maximum when the electrodes are aligned and minimum in the case of complete misalignment.

A possible trend of this capacitance is shown in FIG. 1a. This trend is periodic, and has a succession of stretches increasing in a substantially linear way from a minimum capacitance $C_{min}$ to a maximum capacitance $C_{max}$, the value of which depends substantially on the geometry of the electrodes and their distance apart, and stretches decreasing, also in a substantially linear way and having the same slope as the increasing stretches, from the maximum capacitance $C_{max}$ to the minimum capacitance $C_{min}$.

In a known way, the energy stored in the capacitor is given by the expression:

$$E = \frac{1}{2} C(x) \cdot V^2$$

where $C(x)$ is the capacitance that varies in the sliding direction x, and V is the biasing voltage applied between the stator electrodes and rotor electrodes, having, for example, a pulse-train pattern with rectangular pulses (FIG. 1b).

The component of the electrostatic interaction force along the sliding direction x is given by the expression:

$$F_x = \frac{dE}{dx} = \frac{d\left(\frac{1}{2} C(x) \cdot V^2\right)}{dx}$$

and thus it is a function of the variation of the capacitance C, and in particular of the slope of its increasing/decreasing trend.

According to the direction of the linear displacement that it is desired to generate in the sliding direction x, the biasing pulses are applied alternatively in the increasing stretch (as is shown in FIG. 1b for a single stator electrode) or in the decreasing stretch of the pattern of the capacitance C. It is thus possible to control, via the biasing voltage V, the direction and speed of movement of the electrostatic micromotor.

In addition to the useful component oriented in the sliding direction, which determines the relative movement between the rotor substrate and the stator substrate, the electrostatic interaction force thus generated has a disturbance component oriented in a direction orthogonal to the sliding direction, which tends, for example, to approach the rotor substrate and stator substrate.

This movement is appropriately countered by the elastic elements coupled to the rotor substrate, which for this purpose have a stiffness sufficient for preventing the movement of the rotor substrate in the orthogonal direction.

In a known way, one of the main targets in the development of electrostatic micromotors is to maximize the useful component and minimize the disturbance component of the electrostatic interaction force or, equivalently, to maximize the ratio between useful component and disturbance component.

Furthermore, it is beneficial to guarantee a minimum target of stability of the rotor substrate as regards deformations in the orthogonal direction (e.g., the deformations should stay within a range of +/−200 nm, considering a thickness for the rotor substrate of approximately 400 µm).

BRIEF SUMMARY

One embodiment is an electrostatic micromotor that will represent an improvement of the known art and in particular will enable increase of a useful electrostatic interaction force that is generated in use between the rotor substrate and the stator substrate, consequently increasing the linear force developed by the micromotor and reducing the dissipated energy.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein:

FIGS. 1a and 1b show plots of electrical quantities associated with an electrostatic micromotor;

FIG. 2 shows a cross section through an electrostatic micromotor in accordance with a first embodiment;

FIG. 3 shows a cross section through an electrostatic micromotor in accordance with a second embodiment;

DETAILED DESCRIPTION

Figure 4:
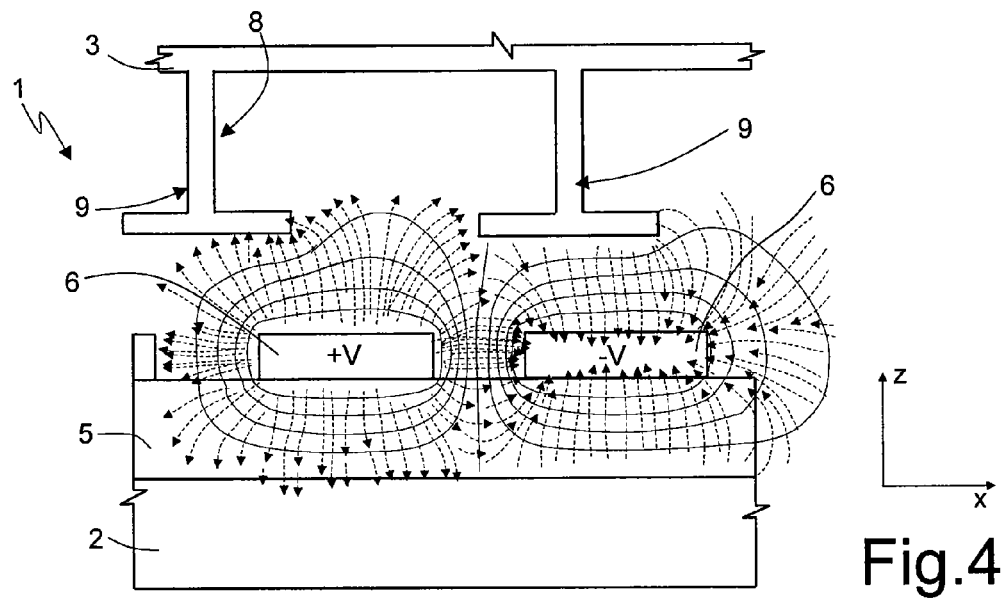
FIG. 4 shows the distribution of electrical field lines in the electrostatic micromotor of FIG. 3 upon application of a given biasing condition.

As is shown in FIG. 2 (which is not drawn to scale, as neither are the subsequent figures), an electrostatic micromotor 1 comprises a stator substrate 2, and a rotor substrate 3 set above the stator substrate 2. Typically, both the rotor substrate 3 and the stator substrate 2 are made of semiconductor material (e.g., silicon).

The rotor substrate 3 is suspended over the stator substrate 2 via elastic elements 4 (shown schematically), anchored (in a way not illustrated) to the same stator substrate 2.

A first insulation layer 5, for example made of silicon oxide, is provided on a facing surface 2a of the stator substrate 2 facing the rotor substrate 3; on this first insulation layer 5 a plurality of stator electrodes 6, made of conductive material, for example polysilicon or metal, is provided. Electrical contacts (not illustrated), arranged in a suitable manner, are connected to the stator electrodes 6 to enable their biasing at desired voltages.

The stator electrodes 6 are arranged at regular distances and spaced apart by a first pitch $p_1$ in a sliding direction x, along which a relative movement of linear translation between the stator substrate 2 and the rotor substrate 3 occurs. The stator electrodes 6 have a shape elongated in a first transverse direction y, orthogonal to the sliding direction x (as is visible in the subsequent FIG. 6).

The rotor substrate 3 has a plurality of rotor indentations (or pits) 8, which open at a respective facing surface 3a facing the stator substrate 2, and extend towards the inside of the rotor substrate 3. The rotor indentations 8 are obtained, for example, by means of chemical etching, and define between them rotor projections (or teeth) 9, facing the stator substrate 2 and the corresponding stator electrodes 6.

Figure 6:
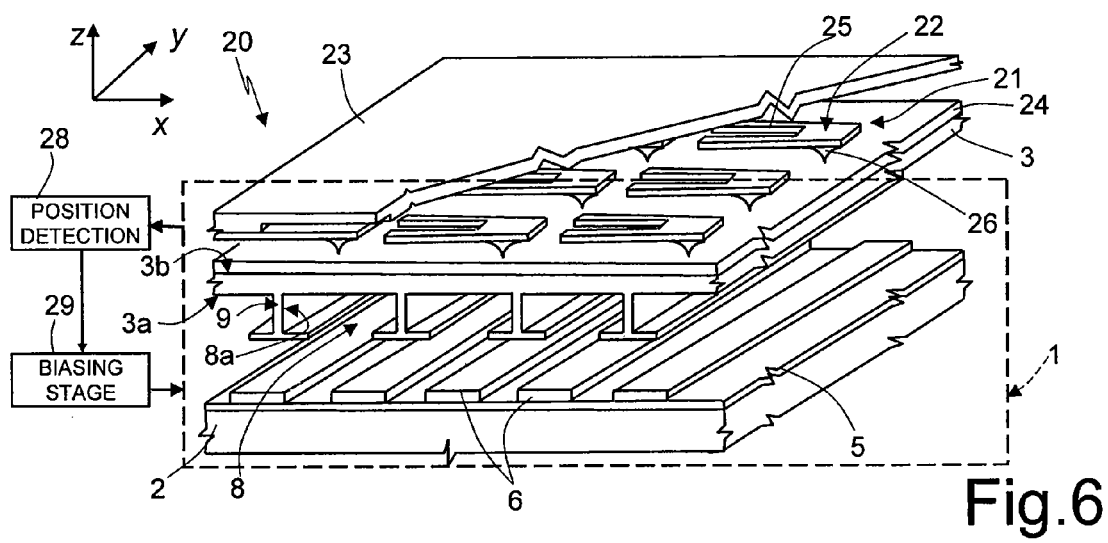
FIG. 6 is a schematic perspective representation of a storage device of the probe-storage type, according to a further embodiment.

The rotor projections 9 are arranged at regular distances, spaced apart by a second pitch $p_2$ in the sliding direction x. The second pitch $p_2$ is different from, for example, greater than, the first pitch $p_1$ (e.g., the first pitch $p_1$ and the second pitch $p_2$ are 2 μm and 4 μm, respectively). The different pitch of the stator electrodes 6 and of the rotor projections 9 enables the relative movement between the stator substrate and the rotor substrate, preventing points of stability of the electrostatic interaction force. The width L (in the sliding direction x) of the stator electrodes 6 and of the rotor projections 9 is substantially the same, for example, 4 μm. The stator electrodes 6 are consequently staggered with respect to the rotor projections 9 in the sliding direction x. The rotor indentations 8 also have a shape elongated in the first transverse direction y (as is shown in FIG. 6), and extend in the rotor substrate 3 in a second transverse direction z, orthogonal to the sliding direction x and to the first transverse direction y, for example, for a depth h of 6 μm.

In use, the rotor substrate 3 is kept at a constant reference potential (e.g., the ground voltage), whilst the stator electrodes 6 are biased with rectangular-pulse trains with an appropriate phase offset between them. In particular, the stator electrodes 6 are divided into sets having the same relative position with respect to corresponding rotor projections 9. Stator electrodes 6 within one and the same set are biased with pulse trains that are mutually in phase, and which have a phase offset with respect to pulse trains for biasing electrodes belonging to other sets (so as to create the aforesaid electrostatic interaction force between the rotor substrate 3 and the stator substrate 2).

The inventors have realized that the useful component $F_x$ of the electrostatic interaction force between stator electrodes 6 and rotor projections 9 (see also the foregoing discussion) increases as the minimum value $C_{min}$ of the capacitance C decreases. In fact, by decreasing the minimum value $C_{min}$, which is reached in this case when the stator electrodes 6 are aligned with the rotor indentations 8, the capacitive variation in the sliding direction x, on which the value of the aforesaid interaction force depends, increases.

In particular, the minimum value $C_{min}$ depends, among other factors, on an interaction occurring between the stator electrodes 6 and side walls 8a of the rotor indentations 8. In fact, between a stator electrode 6 and the aforesaid side walls 8a, an effect of capacitive interaction (the so-called "wall effect") occurs, the consequence of which is a rise in the minimum value of the capacitance C. To eliminate, or at least limit, the aforesaid wall effect on the value of the minimum capacitance $C_{min}$, the rotor indentation 8 is configured so as to increase a distance between its side walls 8a and the stator electrode 6, in the condition of mutual alignment. The rotor indentations 8 consequently have a width, measured in the sliding direction x (or, equivalently, a distance between the side walls 8a), which varies according to the depth within the rotor substrate 3.

In greater detail, the rotor indentations 8 have a first width $d_1$ at the surface 3a facing the stator substrate 2, and widen towards the inside until they reach a second width $d_2$ greater than the first width $d_1$ (and having the maximum value). For example, the maximum width is reached in an area corresponding to one half of the depth h.

The first width $d_1$ coincides with the second pitch $p_2$ between the rotor projections 9, and is substantially comprised between one third and two thirds of the second width $d_2$. For example, the first width $d_1$ is comprised between approximately 1.5 μm and 3 μm, and the second width $d_2$ is comprised between approximately 2 μm and 6 μm.

Basically, the rotor indentation 8 is shaped in such a way that the distance between its side walls 8a in an area corresponding to at least one internal region thereof is greater than the same distance at its mouth, i.e., in a position corresponding to the facing surface 3a.

Furthermore, the distance between the side walls 8a within the indentation is greater than the second pitch $p_2$, throughout the thickness of the same indentation.

In the example of FIG. 2, the side walls 8a of the rotor indentation 8 are not vertical and rectilinear, but curved (concave) and extend towards the inside of the adjacent rotor projections 9. Denoting by A a median axis of symmetry of the rotor indentation 8, orthogonal to the facing surface 3a, the side walls 8a move away from the median axis A, starting from the facing surface 3a, towards the inside of the indentation.

Consequently, the stator electrode 6, when aligned with the rotor indentation 8 (or set in an area corresponding to the median axis A), is at a greater distance from the side walls 8a of the indentation, thus decreasing the contribution of the same walls to the value of the minimum capacitance $C_{min}$. In particular, it is possible to estimate a decrease in the value of the minimum capacitance $C_{min}$ of 10%-20%.

A second embodiment, shown in FIG. 3, envisages a different conformation of the rotor indentations 8, and consequently of the rotor projections 9.

In particular, the rotor projections 9 are shaped like a T turned upside down in a cross section parallel to the sliding direction x, and have a facing portion 9a, which faces the stator substrate 2 and has a width L, and an attachment portion 9b, which is substantially orthogonal to the facing portion 9a and connects the facing portion 9a to the rotor substrate 3. The width of the attachment portion 9b is smaller than the width L, for example approximately one quarter thereof. The rotor indentation 8 consequently has: a mouth portion 12 in a region corresponding to the facing surface 3a, situated between facing portions 9a of two adjacent rotor projections 9, and having the first width $d_1$; and a main portion 14 having a substantially rectangular shape and having the second width $d_2$, greater than, for example twice, the first width $d_1$, situated between the attachment portions 9b of the two adjacent rotor projections 9. It is possible to show that this shape of the rotor indentations 8 enables further increase of the useful electrostatic interaction force between the rotor substrate 3 and the stator substrate 2.

A further aspect enables reduction in the disturbance component of the electrostatic force, oriented in the second transverse direction z.

In detail, a biasing stage, coupled to the electrostatic micromotor 1 and designed to generate electrical signals for biasing the stator electrodes 6 and the rotor projections 9, is in this case configured for biasing stator electrodes 6 adjacent in the sliding direction x with opposite biasing voltages (having, for example, values comprised between +/−40 V and +/−80 V).

As is shown schematically in FIG. 4, the electrical field lines, upon application of opposite biasing voltages +/−V, become denser in the regions between consecutive stator electrodes 6, determining a "squeezing" effect of the resulting electrical field. There is a consequent increase in the useful component and a decrease in the disturbance component of the electrostatic interaction force between the stator electrodes 6 and the rotor projections 9.

Figure 5:
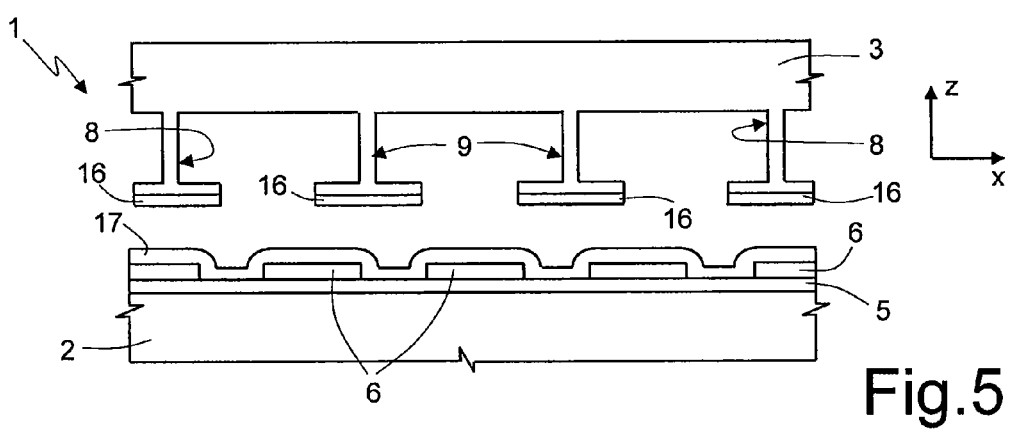
FIG. 5 shows a cross section through an electrostatic micromotor in accordance with a variant.

FIG. 5 shows a variant, which envisages the provision of a symmetrical insulation of the stator electrodes 6 and of the rotor projections 9. In detail, dielectric regions 16, for example, made of silicon oxide, are formed (e.g., by deposition, or by thermal growth) on the surfaces of the rotor projections 9 facing the stator electrodes 6. In addition, a further insulation layer 17 is formed (e.g., by deposition) on top of the first insulation layer 5, thus coating the stator electrodes 6. Advantageously, the effect of said symmetrical oxidation is to concentrate the electrical field lines in the area between the dielectric regions 16 and the top surface of the further insulation layer 17, again determining a "squeezing" of the electrical field and an increase in the useful component, and a decrease in the disturbance component, of the electrostatic interaction force.

Clearly, it is possible to combine the advantages of the two variants described previously; namely, in addition to oxidizing the stator electrodes 6 and the rotor projections 9 in a symmetrical way, it is possible to bias, with opposite voltages, adjacent stator electrodes 6 in the sliding direction x, obtaining in this way an even greater increase in the useful interaction force with respect to the disturbance part of the interaction force.

The electrostatic micromotor 1 described can be advantageously used in an electronic storage device 20 of the "probe-storage" type, as illustrated in FIG. 6.

In detail, the storage device 20 comprises a two-dimensional array 21 of transducers (or probes) 22 fixed to a common substrate 23, for example, made of silicon, obtained with CMOS technology. The two-dimensional array 21 is set above a storage medium 24, for example, made of polymeric material, ferro-electric material, or phase-change material, etc. Each probe 22 comprises a supporting element 25 made of semiconductor material 17, suspended in cantilever fashion over the storage medium 24, and an interaction element 26 (or tip) facing the storage medium 24, and carried by the supporting element 25 at a free end thereof. The interaction element 26 is configured so as to perform operations of reading, writing or erasure, interacting locally with a portion of the storage medium 24.

The storage medium 24 is mechanically and fixedly coupled with respect to the electrostatic micromotor 1, in particular it is set on an outer surface 3b of the rotor substrate 3, opposite to the surface 3a facing the stator substrate 2. In this way, actuation of the electrostatic micromotor 1 causes a corresponding movement of the storage medium 24 in the sliding direction x, and a relative displacement thereof with respect to the probes 22. By appropriately driving the electrostatic micromotor 1, it is possible to control positioning of the probes 22 in positions corresponding to desired points of the storage medium 24, where it is desired to carry out operations of reading, writing, or erasure of the data stored in memory. It proves for this purpose convenient to provide a feedback control in the actuation of the electrostatic micromotor 1 by using a position-detection stage 28, designed to detect the position of the micromotor (e.g., using the capacitive technique), and to feedback transmit the information of the detected position to a biasing stage 29, designed to generate biasing signals for control of actuation of the electrostatic micromotor.

From what has been described and illustrated, the advantages that the electrostatic micromotor 1 enables are evident.

In the first place, the electrostatic approach for obtaining the micromotor is advantageous in so far as it enables a compact structure, stacked in a vertical direction. The rotor indentations 8 generate a variable pattern of the capacitance C between the stator electrodes 6 and the rotor substrate 3, and a consequent interaction force, without requiring complex external metal connections.

The recession of the side walls 8a of the rotor indentations 8 from the stator electrodes 6 enables a reduction in the minimum value of capacitance $C_{min}$, a consequent increase in the useful component of the electrostatic interaction force between the stator substrate 2 and the rotor substrate 3, and a decrease in the dissipated energy. The embodiment described in FIG. 3 proves particularly advantageous in so far as it enables a greater distance of separation between the side walls 8a and the stator electrodes 6 to be achieved.

Likewise advantageous is the possibility of reducing the disturbance component of the electrostatic interaction force by appropriately choosing the biasing signals of the stator electrodes 6 and of the rotor projections 9 so as to maximize the ratio between useful component and disturbance component of the same electrostatic interaction force.

Finally, it is clear that modifications and variations can be made to what is described and illustrated herein.

In particular, it is clear that different shapes can be envisaged for the rotor indentations 8, just as different dimensional values may be used, provided that in any case the effect of moving the side walls 8a of the rotor indentations 8 away from the underlying stator electrodes 6 is obtained. For example, it is possible to envisage different values for the ratio between the first and second widths $d_1$ and $d_2$. Possibly, just one of the side walls 8a within the rotor indentation 8 could be moved away from the median axis A (the rotor indentation 8 not being in this case symmetrical with respect to the same median axis A).

Furthermore, the electrostatic micromotor 1 can be used in other applications, different from the storage device described. For example, it may be used in an optical switch device, of a per-se known type, for moving and orienting means of reflection of a light beam.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrostatic micromotor, comprising:
a fixed substrate having a facing surface;
electrodes arranged on the facing surface of the fixed substrate; and
a mobile substrate facing said fixed substrate and configured for relative movement with respect to said fixed substrate along a direction of movement, said mobile substrate having projections with respective facing surfaces facing the facing surface of the fixed substrate, the projections defining indentations extending within said mobile substrate starting from the respective facing surfaces of the projections, the projections having respective side walls defining said indentations, wherein, for each indentation, the side walls defining the indentation have a first separation distance, at said facing surfaces of the respective projections defining the indentation, and a second separation distance, greater than said first separation distance, at an internal region of said indentation, wherein each indentation has a median axis, and at least one of said side walls defining the indentation is curved and extends away from said median axis, starting from said facing surfaces of the projections defining the indentation, towards the internal region of said indentation.

2. The micromotor according to claim 1, wherein said first and second separation distances are along said direction of movement, and correspond, respectively, to first and second width values of said indentations.

3. The micromotor according to claim 1, wherein said first separation distance is comprised between approximately one third and two thirds of said second separation distance.

4. The micromotor according to claim 1, wherein, for each indentation, said side walls defining said indentation are separated from each other by more than said first separation distance, except at the respective facing surfaces of the indentations defining the indentation.

5. The micromotor according to claim 1, wherein each projection has a T-shaped cross section, and includes:
a facing portion, which includes the facing surface of the projection, (the facing surface of the projection having a facing distance; and
an attachment portion, which is substantially orthogonal to said facing surface, has a width smaller than said facing surface of the projection, and connects said facing portion of the projection to a base portion of said mobile substrate; and wherein each indentation has:
an inlet portion, set between respective facing portions of the projections defining the indentation, having a width equal to said first separation distance, and
a main portion, set between the attachment portions of said projections defining the indentations, having a width equal to said second separation distance.

6. The micromotor according to claim 5, wherein said inlet portion and said main portion have substantially rectangular shapes in said cross section; said cross section being parallel to said direction of movement.

7. The micromotor according to claim 1, wherein the curve is concave shaped.

8. The micromotor according to claim 1, wherein said median axis is an axis of symmetry for said indentation.

9. The micromotor according to claim 1, wherein said electrodes are arranged along said direction of movement according to a first pitch, and said projections are arranged along said direction of movement according to a second pitch greater than said first pitch; said second pitch being equal to said first separation distance.

10. The micromotor according to claim 1, further comprising insulating material regions arranged on the facing surfaces of said projections, respectively, and an insulating material layer arranged on said electrodes and facing said insulating material regions.

11. The micromotor according to claim 1, further comprising a biasing stage configured to generate electrical biasing signals; wherein said electrodes are spaced apart from one another in said direction of movement, and said biasing stage is configured to supply, to consecutive electrodes of the electrodes, biasing signals having opposite polarities.

12. An electronic device comprising:
a movable structure; and
an electrostatic micromotor that includes:
a fixed substrate having a facing surface;
electrodes arranged on the facing surface of the fixed substrate; and
a mobile substrate coupled to the movable structure, facing said fixed substrate, and configured for relative movement with respect to said fixed substrate along a direction of movement, said mobile substrate having projections with respective facing surfaces facing the facing surface of the fixed substrate, the projections defining indentations extending within said mobile substrate starting from the respective facing surfaces of the projections, the projections having respective side walls defining said indentations, wherein, for each indentation, the side walls defining the indentation have a first separation distance, at said facing surfaces of the respective projections defining the indentation, and a second separation distance, greater than said first separation distance, at an internal region of said indentation, wherein each indentation has a median axis, and at least one of said side walls defining the indentation is curved and extends away from said median axis, starting from said facing surfaces of the projections defining the indentation, towards the internal region of said indentation.

13. The device according to claim 12, wherein said electronic device is a probe storage device, wherein the movable structure comprises a storage medium rigidly coupled to said mobile substrate so as to be moved in said direction of movement, the electronic device further including a probe array set above said storage medium for locally interacting therewith.

14. The device according to claim 12, wherein each projection has a T-shaped cross section, and includes:
a facing portion, which includes the facing surface of the projection, (the facing surface of the projection having a facing distance; and
an attachment portion, which is substantially orthogonal to said facing surface, has a width smaller than said facing surface of the projection, and connects said facing portion of the projection to a base portion of said mobile substrate; and wherein each indentation has:
an inlet portion, set between respective facing portions of the projections defining the indentation, having a width equal to said first separation distance, and
a main portion, set between the attachment portions of said projections defining the indentations, having a width equal to said second separation distance.

15. The device according to claim 12, wherein the curve is concave shaped.

16. The device according to claim 12, wherein said electrodes are arranged along said direction of movement according to a first pitch, and said projections are arranged along said direction of movement according to a second pitch greater than said first pitch; said second pitch being equal to said first separation distance.

17. The device according to claim 12, wherein the micromotor includes insulating material regions arranged on the facing surfaces of said projections, respectively, and an insulating material layer arranged on said electrodes and facing said insulating material regions.

18. The device according to claim 12, wherein said electrodes are spaced apart from one another in said direction of movement, the device further comprising a biasing stage configured to generate and supply, to consecutive electrodes of the electrodes, electrical biasing signals having opposite polarities.

19. The device according to claim 18, further comprising:
a position detection stage coupled to the micromotor and the biasing stage and configured to detect a position of the mobile substrate with respect to the fixed substrate and provide a feedback signal to the biasing stage.

20. A process, comprising:
manufacturing an electrostatic micromotor, the manufacturing including:
providing a fixed substrate having a facing surface;
forming electrodes arranged on the facing surface of the fixed substrate; and
forming a mobile substrate facing the fixed substrate and configured for relative movement with respect to said fixed substrate along a direction of movement, said mobile substrate having projections with respective facing surfaces facing the facing surface of said fixed substrate , the projections defining indentations extending within said mobile substrate starting from the respective facing surfaces of the projections, the projections having respective side walls defining said indentations, wherein, for each indentation, the side walls defining the indentation have a first separation distance, at said facing surfaces of the projections defining the indentation, and a second separation distance, greater than said first separation distance, at an internal region of said indentation, wherein each indentation has a median axis, and at least one of said side walls defining the indentation is curved and extends away from said median axis, starting from said facing surfaces of the projections defining the indentation, towards the internal region of said indentation.

21. The process according to claim 20, wherein, for each indentation, said side walls defining said indentation are separated from each other by more than said first separation distance, except at the respective facing surfaces of the indentations defining the indentation.

* * * * *

UNITED STATES PATENT AND TRADEMARK OFFICE
CERTIFICATE OF CORRECTION

PATENT NO. : 8,362,674 B2
APPLICATION NO. : 12/533835
DATED : January 29, 2013
INVENTOR(S) : Bruno Murari et al.

It is certified that error appears in the above-identified patent and that said Letters Patent is hereby corrected as shown below:

In the Claims:

Column 8, Line 9:
"projection, (the facing surface of the projection having a" should read, --projection, the facing surface of the projection having a--.

Column 9, Line 16:
"projection, (the facing surface of the projection having a" should read, --projection, the facing surface of the projection having a--.

Signed and Sealed this
Twenty-seventh Day of August, 2013

Teresa Stanek Rea
*Acting Director of the United States Patent and Trademark Office*